March 2, 1965  R. A. VOLZ  3,171,820

RETICULATED POLYURETHANE FOAMS AND PROCESS FOR THEIR PRODUCTION

Filed Feb. 17, 1964

INVENTOR:
ROBERT A. VOLZ
BY
ATTY

United States Patent Office 3,171,820
Patented Mar. 2, 1965

3,171,820
RETICULATED POLYURETHANE FOAMS AND PROCESS FOR THEIR PRODUCTION
Robert A. Volz, Prospect Park, Pa., assignor to Scott Paper Company, Philadelphia, Pa., a corporation of Pennsylvania
Filed Feb. 17, 1964, Ser. No. 345,352
12 Claims. (Cl. 260—2.5)

This invention relates to novel reticulated polyurethane foams and to processes for their production. This application is a continuation-in-part of application Serial No. 655,368, filed April 26, 1957, now abandoned, which is a continuation-in-part of application Serial No. 591,623, filed June 15, 1956, now abandoned.

The composition aspect of this invention resides in the concept of a 3-dimensional network of interconnecting strands of a polyurethane resin, preferably one formed by the reaction of an organic polyisocyanate with a polymer selected from at least one member of the group consisting of polyalkylene ether glycols, polyalkylene ether amines produced by the reaction of alkylene-oxides with polyamines and polyesters produced by the reaction of polyhydric alcohols with polycarboxylic acids, said strands being integrally interconnected by thickened nexus at spaced apart points so as to form the isotropic skeletal outline of a multitude of polyhedrons whose faces are polygonal, are common to a polyhedron adjacent thereto, are open and substantially free from membraneous polyurethane resin, said network being substantially free from permeatoidally degraded strands and nexus. Permeatoidal or permutoidal degradation as used herein means throughout the structure as opposed to surface or topical degradation.

These compositions and their embodiment in articles of manufacture can be described as reticulated polyurethane foams.

A polyurethane resin or polymer is formed by the reaction of a diisocyanate with a polyhydroxy material. Generally, these resins are classed as, e.g., polyether or polyester polyurethanes, depending on the chemical nature of their polymeric units. There are other, less commonly used, types classified as to the nature of the polymer with which the isocyanate is reacted. A polyurethane foam is produced by generating $CO_2$, e.g., by reaction of water with an isocyanate, or other gas in the reaction mixture, e.g., by a vaporization of a volatile liquid by the heat of reaction, while converting a liquid form of the polymer to a solid form of the polymer, e.g., by cross-linking or otherwise increasing the molecular weight of the liquid polymer.

In the preparation of foamed polymeric cellular structures, a gas or vapor is generated while the material to be formed is in the plastic state. The generation of this gas results in the formation of bubbles, approximately spherical in form. As these bubbles expand, cells are formed which have more or less definite geometric configurations. The optimum packing for spheres is an arrangement in which each sphere is surrounded by 12 other spheres; and correspondingly it has been found that the cells formed by the expansion of gas bubbles to the point of contact, so as to produce low-density, open-cell cellular structures, generally are in the form of dodecahedrons, with pentagonal sides or faces. This is the general rule, though in any foamed mass will be found cells of varying geometry. At the intersection of the faces are heavier strands of material. Between the strands forming the cell faces or walls are very thin membrane-like films. Some, e.g., about 17% or more, but generally a minor proportion of the faces rupture during foaming, so that the cells are interconnected. Such a foam is referred to as open-celled.

Open-celled polyurethane foams, although their cells are interconnecting, have relatively low fluid permeability compared to the reticulated foams of this invention. Also stretching as well as shearing of such open-celled polyurethane foams causes the weakest link of the foam, i.e., the membranes, to rupture and this rupture propagates through the foam readily. Because these membranes are absent in the foams of this invention, the foam body acts as a flexible net which permits the tear and tensile forces to be more evenly distributed throughout the foam body. Thus, a reticulated polyurethane foam of this invention has higher tensile and tear strength than a corresponding polyurethane foam having membranes broken or unbroken over at least a portion of the faces of the cells.

The reticulated polyurethane foams of this invention have, compared with membrane-bearing open-celled polyurethane foams otherwise corresponding thereto, greatly increased porosity and, depending upon the extent of reticulation, decreased density of varying degrees. Additionally, it has been found that the products obtained by the hydrolysis process of this invention have, compared to the cellular structures from which they are obtained, improved softness and compliance, and/or resistance to degradation of load-bearing properties on aging under conditions of high humidity, and increased hydrophilicity. The compresison/deflection characteristics of the open-celled polyurethane foams converted to the reticulated products of this invention are altered and improved. The particular properties of the 3-dimensional network structures obtained vary, depending on the nature of the polymer comprising the strands of which they are constructed, and on the size and spacing of the strands; and the products range from soft, lacy, diaphanous materials to stiff, thick stranded structures.

Flexible and soft network structures prepared in accordance with this invention are of particular interest, in the form of thin sheets, as materials for use in the construction of insulating linings for coats, jackets, and similar garments, since the present materials of high tensile strength are strong and readily sewn, and are substantially free of difficulties with tearing and shredding encountered with previously known polymeric foamed cellular structures. For such application in the manufacture of clothing, and the like, the hydrophilic character of the reticulated polyurethane foams produced by the hydrolysis technique is of particular advantage. Additionally, depending on the nature and properties of the reticulated products, such as pore size, flexibility, and the like, the novel materials provided by this invention are of utility as filtering devices, gas-liquid contacting devices, catalyst carriers, rug anchors, door mats, drain pads, scouring pads, sponges, insulating pads, tire liners, spacing devices, flexible partitions, draperies, upholstering padding, mattresses, pillows, and the like.

The above-described reticulated polyurethane foams can be produced by different techniques, one of which is the process aspect of this invention.

The process aspect of this invention resides in the concept of a method of producing the above-described reticulated polyurethane foams by subjecting a foamed open-cell cellular polyurethane resin as defined herein to the hydrolytic action of water in the presence of a hydrolysis catalyst which accelerates the hydrolytic action until at least substantially all membraneous polyurethane is removed from the foam, thereby effecting a partial weight-loss in the foam structure, and recovering the resulting skeletal network structure, i.e., reticulated polyurethane foam.

It is an object of this invention to provide the novel integrally formed 3-dimensionally reticulated polymeric structures described herein.

Another object of this invention is to provide a polyurethane foam of improved porosity.

A further object is to provide a low density polyurethane foam of improved strength properties.

Still another object is to provide a permeable low density polyurethane foam of improved tear strength.

Another object is to provide a method of converting open-cell polyurethane foams as defined herein into 3-dimensionally reticulated structures as defined herein.

An additional object is to provide a method of increasing the softness, flexibility, and porosity of polyurethane foams as defined herein.

Other objects will be apparent to those skilled in the art to which this invention pertains.

The reticulated polyurethane foams of this invention can also be produced by a high temperature flame front, generated by an exploding gas mixture, passing through a membrane-bearing open-celled polyurethane foam as described herein. These explosion reticulated polyurethane foams can be distinguished from hydrolysis reticulated polyurethane foams by the fact that the explosion treatment glazes the surface of the foam strands, whereas hydrolysis reticulated foams generally have a rough, matte-like surface as the membranes and strands are affected at a less uniform rate.

Various oxidizable gases mixed with oxygen can be used for explosion reticulation. Acetylene and propane are preferred although methane, ethane, butane, ethylene, hydrogen, and low-boiling liquids, e.g., methylethyl ether, dimethyl ether, diethyl ether and isopropyl alcohol can also be used.

There are other ways in which open-celled polyurethane foams can be at least partially "dewindowed." For example, prolonged exposure to non-catalyzed aqueous hydrolytic conditions at about room temperature will cause foams formed of polyurethane readily susceptible to hydrolysis to gradually depolymerize, soften and decompose. Such softening is the result of a loss of polymer strength and is in contradistinction to the softening associated with the present process caused by the elimination of the gusseting action of the membranes present in the starting foams. The membraneous portions will gradually be lost in such a process in an erratic fashion, some portions being relatively readily lost by a mechanism whereby the hydrolysis of certain polymer units apparently accelerates the hydrolysis of adjacent units to cause fairly rapid loss of polymer, and some being retained for prolonged periods of time. However, under such hydrolytic conditions the polyurethane throughout the foam, including that forming the strands and nexus, suffers from extensive permeatoidal degradation so that the loss of the membraneous polyurethane is accompanied by a high degree of depolymerization throughout the foam and an unacceptable product inevitably results.

Another, more rapid, technique of opening faces of such open-celled foams to increase their porosity is by the use of steam under essentially neutral conditions, i.e., heating the foam in the presence of steam for prolonged periods of time to break and sometimes ultimately remove at least a portion of the membraneous polyurethane and thus reticulate the foam. Although this treatment produces a more open-celled product and ultimately with some polyurethanes a reticulated product, the residual strands and nexus suffer from substantial permeatoidal degradation, the degree depending upon the selected polyurethane and the time and/or temperature of treatment. The resulting reticulated product, if formed, consists of soft relatively weak polyurethane polymer unacceptable for many purposes. Moreover, such permeatoidal attack by the steam during the treatment also renders the residual polymer skeletal structure more susceptible to further degradation. Thus steam treatment cannot ordinarily be used to produce a product substantially free from permeatoidal degradation.

Other techniques for dewindowing the foam, e.g., oxidative degradation, also is subject to the same criticism. It is important the removal of the membraneous polyurethane be a rapid but nevertheless a controlled removal so as to avoid undesirable degradation of the residual strands and nexus. Obviously also, if a skeletal structure as described herein is to be produced, the reticulation process must also be terminated while a skeletal structure remains, so that the skeletal structure can be recovered.

For determining the permeatoidal degradation under the hydrolysis conditions used (time of exposure of foam to a given concentration of hydrolysis agent at a given temperature), a suitable solvent, such as, dimethylacetamide, dimethylformamide or halogenated hydrocarbons, etc., is employed to obtain linear or volumetric swelling. If permeatoidal degradation is present, the foams tend to swell more than normally found with topically hydrolyzed foams.

If the swelling test does not show permeatoidal degradation of the reticulated foam, then standard compression/deflection tests of the foam are used to indicate permeatoidal degradation, although generally this test is relative in that a comparison must be made with the same starting foam having approximately the same weight loss known not to be permeatoidally degraded (treated under different conditions of time-temperature and same or different hydrolyzing agent).

Foamed, open cell cellular polyurethane resin structures of the construction described above and useful for the preparation of the reticulated structures of this invention are well known in the art. Such cellular structures are sometimes referred to as low density foams, since they contain a minimal weight of polymer for the volume occupied by the mass. Methods whereby foamed open-cell cellular structures may be produced, as by the use of blowing agents and similar techniques for the incoporation of expanding bubbles of gas or vapor in a plastic mass of polymer, are fully described in published literature.

These cellular polyurethane resin structures are generally characterized by bonds comprising at least a portion of the bonds of the polymer chain. By bonds of the polymer chain are meant bonds connecting recurring chain units in polymeric molecules, and forming the binding forces whereby the polymeric nature of the molecule is maintained. These bonds may be interspersed between radicals containing only a few carbon atoms each, i.e., the repeated bond and radical units in totality forming a polymer, or the bonds may connect molecular chains which are individually polymeric in nature, the bonds having either a chain-extending or a cross-linking relationship to these polymeric molecular chains. As opposed to functional groups dependent from polymeric molecules, bonds of the polymer chain, at least at positions removed from the chain ends, are molecular-weight controlling, i.e., on cleavage of a single such bond, the polymer molecular weight is decreased substantially.

Polymers of this type are generally condensation polymers, but are not limited thereto.

One class of presently useful polymers comprises the polyesters, also known as alkyd resins. Polymers of this type contain as chain-bonding linkages carboxylic acid ester bonds of the type which are relatively readily cleaved by hydrolyzing agents. Polyesters prepared by a polymer chain-forming reaction of approximately equiequivalent amounts of a polyfunctional acid with a polyfunctional alcohol are, strictly speaking, referred to as polymeric polyesters, as distinguished from monomeric polyesters such as triglycerides or oils.

Another class of polymers which, in the form of cellular structures, are adapted for conversion to reticulated structures in accordance with this invention, comprises isocyanate-modified polymers. The isocyanate-modified polymers are polymeric materials wherein residues of polyisocyanates, such as toluene diisocyanate, form a part of the polymer chain.

The type of bond into which the isocyanate radical is converted in the chain-forming reaction can be in addition to a urethane bond, a urea bond, an amide bond, or other bond, depending on the functional group or compound with which the isocyanate radical has reacted. In general, the polyisocyanate residues form only a minor portion of the chain in isocyanate-modified polymers. The polyisocyanates act as chain extenders for other polymeric molecules furnishing functional groups with which isocyanate radicals react, and link these polymeric molecules together into composite ultimate polymer molecules. The initial polymeric molecules with which the polyisocyanate is reacted may be designated secondary polymers.

Isocyanate-derived polymers are particularly readily prepared in the form of foamed, open-cell cellular structures, since the gas by which the polymer is foamed may be generated by the same reactions by which bonds in the ultimate polymer chain are formed. One class of secondary polymers from which foamed isocyanate-modified polymers may be produced comprises polyesters, as described hereinabove. If, in the synthesis of the polyester, the polyfunctional acid is present somewhat in excess as compared to the polyfunctional alcohol, the resulting polyester contains terminal free acid groups. Reaction of isocyanate radicals with such carboxylic acid groups results in formation of amide bonds, with generation of foam-forming carbon dioxide as a by-product. By virtue of their polyfunctionality, the polyisocyanate residues function as bridges between the molecules of the polyester chains, and produce cross-linked, high molecular weight polymers.

Alcohol-terminated polyesters are also convertible to isocyanate-derived polymers, and hydroxyl-substituted polymers or polyols, such as polyesters containing free hydroxyl groups, are the secondary polymers used to prepare an important class of isocyanate-derived polymers, the polyurethanes. The reaction by which isocyanate-derived polymers of the polyurethane type are prepared, involving the union of a hydroxy group with an isocyanate radical to form a urethane bond, is not productive of by-product carbon dioxide, in contrast to the amide-forming condensation reaction described above. For foam production, an isocyanate-derived polymer of the polyurethane type may be treated, during or subsequent to reaction of the polyisocyanate with the secondary polymer or polyol, with a chain extending agent, usually water, with which isocyanate radicals react to form carbon dioxide, while urea bonds, —NHCONH—, are generated.

Isocyanate-derived polymers prepared by reaction of a polyisocyanate with a polyol are described by reference to the nature of the bond formed by the isocyanate radical in reaction with the secondary polymer, and by the nature of the secondary polymer. Thus, the isocyanate-derived polymers prepared by reaction of a polyisocyanate with a polyol of the polyester type are designated polyester polyurethane polymers or polymeric polyester polyurethanes; if desired, they may more briefly be referred to as polyester polyurethanes.

Open-cell foamed cellular structures of polymeric polyester polyurethane form one particularly preferred starting material for preparation of reticulated structures in accordance with this invention. Any of a variety of polyesters may be employed in preparation of such cellular structures. It is possible to prepare isocyanate-derived polymers from monomeric polyol polyesters of relatively high molecular weight, such as castor oil. Preferably, the present polyurethanes are prepared from polymeric polyesters, as described hereinabove. These polyesters may comprise simple straight-chain polymers such as the reaction product of adipic acid and diethylene glycol, or may be styrene- or oil-modified or otherwise varied, as is well understood in the art of foamed isocyanate polymer synthesis. As will be apparent from the description above of the chemical bonds involved in the steps of isocyanate-derived polymer foamed cellular structure synthesis, in foamed isocyanate-derived polymers prepared on a basis of a polyester secondary polymer, whether the polyester is a polyol, that is, a polymer containing hydroxy groups reactive with isocyanate radicals, or whether the reactive functional groups of the polyester are acid radicals, the foamed cellular structure obtained will contain ester hydrolyzable bonds and also urethane, amide, and/or urea hydrolyzable bonds and one or more of the hydrolyzable types of bonds present in the polymer may be attacked in preparation of reticulated structures by treatment of the foamed cellular structure in accordance with this invention.

Another class of polyols with which polyisocyanates may be reacted to form foamed open-cell cellular structures comprises polyethers, and the conversion of such cellular structures to reticulated products forms another preferred embodiment of this invention. Illustrative of polyethers from which foamed cellular structures of polymeric polyether polyurethanes may be prepared are aliphatic alkylene glycol polymers, as exemplified by poly-1,4-butylene ether glycol. Aliphatic ether bonds are generally resistant to hydrolysis, but the urethane and urea bonds in polyether polyurethane foamed products are susceptible to hydrolytic cleavage, and it is believed that hydrolysis of the urethane and/or urea bonds is involved when polymeric polyether polyurethane cellular structures are converted by hydrolyzing agents in accordance with this invention to yield porous network structures. Additionally, polyether molecules may include the residues of a variety of compounds such as amines and the like, which are reactive with alkylene oxides, from which latter compounds polyethers are prepared. Such modified polyethers may also be used for preparation of polymeric polyurethane cellular structures, and foamed products of this type may be susceptible to hydrolytic attack not only at urethane and urea bonds, but also at bonds and similar chain-linking bonds, especially tertiary amine positions, sensitive to hydrolysis. In another variation, a polyether may be modified by reaction with an epoxy resin prior to or concurrently with introduction of isocyanate residues and production of a foamed cellular product. Procedural details and variations which may be made in selection of the nature of the polyether used, the polyisocyanate with which it is reacted, and so forth, are well known in the art.

In further extension of the scope and variety of isocyanate-derived polymer foamed cellular structures available, polyisocyanates may be reacted under foam-producing conditions with any of a number of different polymers wherein functional groups reactive with isocyanate radicals are present, including polyesteramides, and the like. If less than the stoichiometric amount of polyisocyanate is reacted with the polymer, low index foams are produced.

A 100 index foam in polyurethane art is defined as a foamed polyurethane polymer prepared by adding to the resin and water the stoichiometric amount of polyisocyanate. Normal polyurethane polyester foams are made with an excess of polyisocyanate, i.e. from 102% to about 110% based on the stoichiometric requirement. These foams are 102 to 110 index foams. Formulations having less than 85% (an 85 index foam) of stoichiometric amount of polyisocyanate produce incompletely cross-linked polymers with properties normally associated with degraded foams, e.g., poor compression set properties and extreme softness. Foams of indexes above 95 are preferred; those of 100 and above are most preferred. Generally, the polyisocyanate is not used in amounts higher than those giving 125 index foam because another type of incompletely reacted product is produced and because polyisocyanate is generally more expensive than the other starting materials.

Further, improperly cured foams sometimes indicate properties of degraded foams.

The pore size of cellular structures produced in isocyanate-derived polymer synthesis may be controlled as desired, by adding foam-stabilizing or coalescing agents. The flexibility of the products may be varied by judicious selection of secondary polymer and isocyanate with respect to chain branching, steric hindrance of rotation and similar considerations.

The production of foamed open-cell cellular structures of isocyanate-derived polymers of various types is well understood in the polymer art, and is described for example in "German Plastics Practice," published by Debell and Richardson, 1946, Chapter 21, "Plastic Foams," pages 462–465; in "Papers Presented at the Atlantic City Meeting: Synthesis of Isocyanate Polymers," published by the American Chemical Society, Division of Paints, Plastics and Printing Ink Chemistry, September 1956; and in the patent literature.

To convert low density open-cell cellular structures as described herein into the reticulated products in accordance with the hydrolysis process of this invention, the cellular or foamed structures are subjected to controlled catalyzed hydrolysis. Hydrolysis as used herein means a decomposition or depolymerization reaction caused by water. Although water alone will hydrolyze the more hydrolysis susceptible polyurethane foams at elevated temperatures, to avoid substantial permeatoidal degradation of the strands and nexus, steam alone will rarely, if ever, suffice as a reticulating agent within the meaning herein to produce reticulated products substantially free from permeatoidal degradation. Therefore, the hydrolysis is conducted in the presence of a hydrolysis catalyst, preferably an ionic hydrolysis catalyst. Enzymes, e.g., an esterase such as lipase or a protease such as pepsin, are illustrative of essentially non-ionic catalysts. However, such catalysts have a limited range of effectiveness. Therefore, the ionic catalysts, i.e., those which substantially increase the hydrogen or hydroxyl ion concentration of water are preferred, e.g., strong acids, strong bases, or strongly acidic or basic salts. Preferably these catalysts are used in an amount or at a concentration which shifts the pH of the hydrolyzing aqueous solution thereof at least 1.5 pH units from neutrality, more preferably, at least 3 and most desirably at least 6.

In accordance with the present process, factors such as temperature, time, type and concentration of catalysts are controlled, while cellular structures are treated under hydrolyzing conditions to remove at least a major portion of the cell faces thereof, preferably without concomitant substantial permeatoidal degradation of the strands and nexus, and the resulting reticulated structure is recovered. The hydrolysis need be controlled to the extent that the skeletal celliform structure of the mass, that is, the strands and nexus forming the outline of the cellular structure, is not destroyed, which can readily be determined visually, and, if the structures claimed herein are to be produced, hydrolysis conditions are employed such that the structure remaining is substantially free from strands and nexus permeatoidally degraded as a result of the hydrolysis. There is a fairly wide range of latitude in the extent of hydrolysis which may be allowed to occur, as between scant removal of a major portion of the cell faces, with a marked increase in porosity of structure, and continuation of hydrolysis until the strands are topically attacked and thinned down, with a consequent substantial softening of the structure. Properties such as softness, tear strength and porosity generally increase markedly upon membrane removal. Strength properties generally pass through a maximum and subsequently decrease if hydrolysis is continued beyond membrane removal. The severity of the hydrolyzing conditions may accordingly be varied depending on the qualities desired in the product. Weight loss paralleling the progress of the hydrolysis, the degree of which varies with the nature of the polymer, may be useful as a measure of the extent of hydrolysis occurring and change in properties of the structure being produced by the treatment. For example, for polyester polyurethanes, a weight loss of about 5–15 percent, preferably about 10 percent, appears to give optimum strength properties.

Particularly efficacious as ionic hydrolysis catalysts in the process of this invention are the strongly alkaline bases; e.g., the alkali metal hydroxides, including sodium hydroxide or potassium hydroxide, ammonium hydroxide, quaternary ammonium bases such as benzyltrimethylammonium hydroxide, amines such as methylamine, alkaline salts such as trisodium phosphate, and the like. When aqueous alkali is employed, lower temperatures can be used than with water or steam alone, depending on the alkalinity of the solution; and in most cases desired results can be obtained at temperatures between about 20° C. and the boiling point of the solution at atmospheric pressure, although higher temperatures, as discussed above, can be used. As a general rule topical rather than permeatoidal hydrolysis of the structure is favored at higher temperatures with shorter reaction times. Therefore, a temperature above room temperature, e.g., above 30° C. and desirably above 50° C. is preferred. When aqueous alkali is employed, particularly advantageous results are obtained when the pH of the medium is above about 8.5, and preferably above about 10, and most preferably at 13 or higher.

By far the most efficacious of the alkaline ionic catalysts are the alkali-metal hydroxides. Although the optimum concentration of these hydroxides will depend upon the chemical nature of the polyurethane foam to be reticulated, generally quite concentrated solutions will be employed as the more alkaline the water employed to achieve reticulation, the less danger of concomitant permeatoidal degradation of the strands and nexus of the foam. Generally, the hydrolysis rate is, therefore, controlled by temperature and/or time rather than by catalyst concentration as the strongest catalyst solution which produces a controllable hydrolysis reticulation within the time and temperature limitations of the operation is usually preferred. Aqueous sodium and potassium hydroxide solutions of at least 2 percent and preferably at least 5 percent e.g., about 8 percent to 25 percent are preferably employed.

Alternatively, the hydrolysis can be carried out in the presence of aqueous acid, usually quite concentrated, e.g., at least 5 percent and preferably at least 10 percent. Examples of inorganic acids that can be employed are hydrochloric acid, sulphuric acid, phosphoric acid, and the like. Examples of organic acids that can be employed are strong sulphonic acids such as toluene sulphonic acid, carboxylic acids such as trifluoroacetic acid, and the like. When aqueous acid is employed, particularly advantageous results are obtained when the pH of the medium is below about 5.5, preferably below about 4 and most preferably 1.0 or lower. Strong inorganic acids are therefore preferred. The temperature of the solution can be as described above in connection with alkaline solutions. Generally speaking, an acid catalyzed hydrolysis reticulation is more apt to produce permeatoidal degradation in the strands and nexus than is alkaline catalyzed hydrolysis and for this reason the latter is preferred.

The reaction time required to achieve reticulation is dependent upon reaction temperature, catalyst and its concentration, and the chemical structure of the polyurethane. Generally, longer reaction times are required for polyether polyurethanes than polyester polyurethanes. Conventionally, a reaction time from about one or two minutes to about 20 or 30 minutes to as long as one or two hours is employed.

Whatever hydrolysis technique is employed, a weight loss in the polymer structure results, first by the removal of the membraneous polymer from the structure which can be substantially complete with a weight loss as low as 0.5 percent and thereafter weight losses as high as about 50 percent or more, e.g., up to 75 percent can be achieved by topical removal of polymer from the strands and nexus. If the hydrolysis medium is uniformly distributed throughout the structure, the course of the hydrolysis can be followed by visual examination of the exterior of the structure. When the hydrolysis has proceeded to the desired extent, the hydrolytic action is terminated, e.g., by one or more of cooling and removal of the hydrolysis catalyst from the structure, e.g., by washing and also neutralization if desired, and then recovering the resulting skeletal structure.

Reference is made to the drawings in which.

Figure 1:
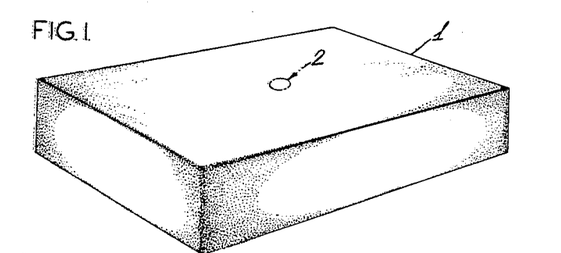
FIGURE 1 is a perspective view of a block of a typical foamed open-cell cellular polyurethane of the prior art.
Figure 2:
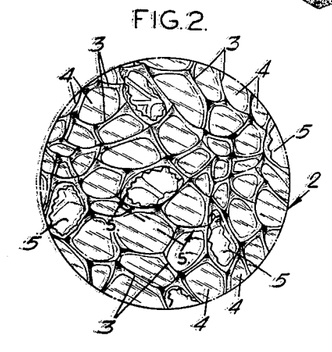
FIGURE 2 is an enlarged view of the area 2 of the surface of the block of cellular polyurethane shown in FIGURE 1.

In FIGURE 1, 1 is the block of open-celled polyurethane and 2 is a small area from which an enlarged view is taken in FIGURE 2.

Figure 4:
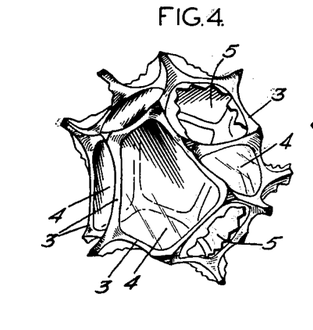
FIGURE 4 is an enlarged perspective view of a typical cell of the block of foamed open-cell cellular polyurethane shown in FIGURE 2.
Figure 5:
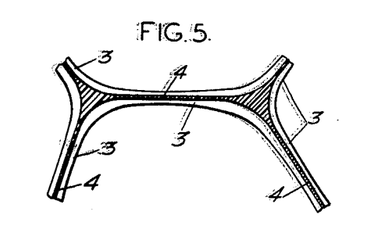
FIGURE 5 is a sectional view taken along line 5—5 of FIGURE 2.

As shown by the enlarged view of area 2 of the surface of block 1 in FIGURE 2, and the enlarged view of a cell thereof in FIGURE 4, the strands 3 form junctions between the faces or walls of the cells of the foam with the thin membrane-like polymer 4 forming faces or walls themselves. A portion of the areas 5 between strands contain no membrane-like materials and thus provide an open face to the cell. Such areas result from rupture during cell formation. The general cross-sectional nature of strands 3 in relation to the faces or walls 4 is shown in FIGURE 5.

Figure 3:
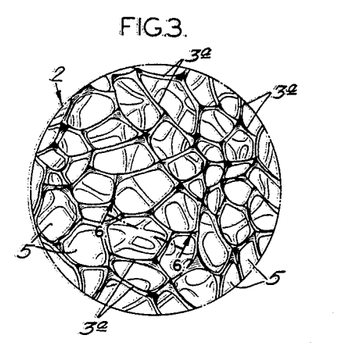
FIGURE 3 is an enlarged view of an area comparable to that shown in FIGURE 2, of a reticulated foam of this invention produced by the hydrolysis technique described herein.
Figure 6:
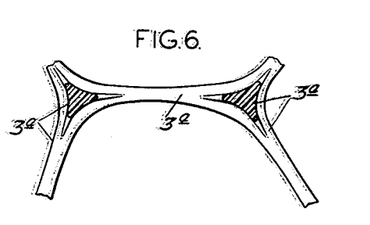
FIGURE 6 is a sectional view taken along line 6—6 of FIGURE 3.
Figure 7:
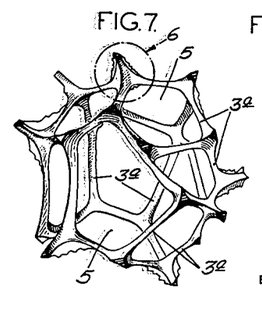
FIGURE 7 is an enlarged perspective view of a typical cell of the skeletal structure shown in FIGURE 3.

As shown in FIGURES 3, 6 and 7 when the block 1 has been reticulated in the manner described herein at least a major portion and preferably substantially all of the membrane-like polymer 4 of the cell faces is removed. The resulting reticulated structure is essentially a 3-dimensional network of strands 3a defining the outline of the original cell faces. The cross-sectional view of strands 3a is shown in FIGURE 6.

Figure 8:
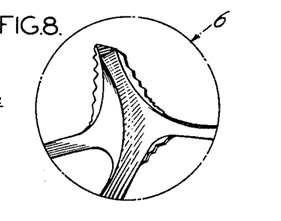
FIGURE 8 is an enlarged view of the nexus of the strands in the cell illustrated in FIGURE 7, within area 6.

The more enlarged view of FIGURE 7 of the cell shown in FIGURE 3 shows in detail the manner in which strands 3a define the outline of open polygonal faces of the polyhedral cell. The face areas 5 between the strands 3a and strand nexus 6 are open and contain no membrane-like material. The triangular nature of the polymer strands at their point of intersection and the non-planar nature of the nexus is shown by FIGURE 8. The nexus of the strands are thickened as compared to the strands. Consequently, in the novel reticulated structures, the intersections of the strands are particularly strong and coherent. Each strand diverges from the other three strands at the intersection at an angle approximately normal to the plane of the other three strands, and as a result, the reticulated structure derived therefrom tends to be isotropic and non-directional in response to stress. Although the strands of a typical hydrolysis reticulated foam are roughly triangular in cross section, with extensive hydrolysis or upon explosion reticulation the strands are thinned down and/or rounded off to present a less angular structure.

The reticulated product of the present invention can thus be characterized as a polyurethane resin structure in which the strands forming the 3-dimensional network intersect in an integrally formed non-planar nexus, and define, in skeletal form, the outline of multi-sided, polyhedral cells. The average diameter of the polygonal cell faces outlined by the strands may vary, as determined by the pore size or cell face diameter of the cellular structures from which the skeletal structures are obtained, from about 0.05 mm. to about 20 mm.

The following examples are illustrative of this invention but are not to be construed as limiting.

PREPARATION 1.—OPEN CELLED POLYURETHANE FOAM

*Component A.*—Into a closed container equipped with an agitator and means for maintaining a nitrogen gas sweep are charged, at room temperature, 50 parts, by weight, of an approximately 80:20 isomeric mixture of toluene-2,4-diisocyanate and toluene-2,6-diisocyanate ("Hylene TM," sold by E. I. du Pont de Nemours & Co., Inc., Wilmington, Delaware), and 50 parts, by weight, of a polyester resin (alkyd) ("Paraplex U-148," sold by Rohm and Haas Company, Philadelphia, Pa.), having the following properties:

Number average molecular weight __ 1800–2000.
Equivalent weight ________________ 745–830.
Hydroxyl number _________________ 65–75.
Acid number _____________________ 3 maximum.
Water content ____________________ 0.25% maximum.
Average hydroxyls per molecule ____ 2.42.

The above-described mixture is agitated under a maintained nitrogen atmosphere for four hours, the temperature rising to approximately 32° C.

*Component B.*—There are blended at room temperature 80 parts by weight of the polyester resin described above, 0.6 part by weight of a polyoxyethylated vegetable oil dispersing agent ("Emulphor EL-719," sold by General Aniline and Film Corp., New York city, N.Y.), 4.5 parts by weight of water and 1.9 parts by weight of diethylethanolamine.

100 parts by weight of component A are added to 87 parts by weight of component B and thoroughly mixed for about 20 seconds at a starting temperature of about 25° C. The mixture is then immediately poured into a container of sufficient volume to permit expansion. After about 15 minutes the product sets to a cellular mass, the temperature rising to about 75° C. The container together with the foamed cellular mass is placed in an oven and held at 70° C. for approximately 16 hours. The product, in the form of an open-cell, foamed mass and having carboxylic ester linkages, is removed from the container and cut into blocks.

The blocks have a density of 0.046 gram per cubic centimeter. The proportion of closed cells in the product is very small, and the cell faces have an approximate diameter of 0.3 mm.

PREPARATION 2.—OPEN CELLED POLYESTER POLYURETHANE FOAM

The following materials are blended together at room temperature: 40 parts by weight of the polyester resin (alkyd) employed in Preparation 1, 0.04 part by weight of the polyoxyethylated vegetable oil employed in Preparation 1, 1.1 parts by weight of water, and 0.4 part by weight of diethylethanolamine.

To the above mixture are then added 15 parts by weight of the mixture of toluene-2,4-diisocyanate and toluene-2,6-diisocyanate employed in Preparation 1.

The resulting combination is mixed thoroughly with rapid agitation for 20 seconds, and immediately poured into a container of sufficient volume to permit expansion, the temperature rising to about 85° C. After about 15 minutes, the container including the foamed mass is placed in an oven and maintained at 70° C. for 16 hours. The foam is then removed from the container and cut into blocks.

The proportion of closed cells is very small, the pores having an average diameter of 0.2–0.3 mm.

PREPARATION 3.—OPEN CELLED POLYALKYLENE ETHER POLYURETHANE FOAM

*Component A.*—To a closed agitated vessel equipped with a nitrogen gas sweep were charged at 40° C. 100 parts by weight of a molten polyalkylene ether having a hydroxyl number of 37.6, a water content of 0.04 percent, and a melting point about 35° C., identified as "Teracol 30," which is believed to be a 1,4-polybutylene ether glycol (sold by E. I. du Pont de Nemours & Company, Inc., Wilmington, Delaware). Next, 12.6 parts by weight of the toluene-2,4- and 2,6-diisocyanate mixture employed in Preparation 1 were added at a temperature of 35° C., and agitation was commenced. There was a mildly exothermic reaction, the temperature rising to 45–50° C. Heat was then applied and the mixture was maintained at 60° C. for 2½ hours. Then an additional 12.6 parts of the diisocyanate were added and the temperature was raised and maintained at 140° C. for 2½ hours. The charge was then cooled to 50° C. and a further 3.7 parts by weight of the diisocyanate were added and mixed in. Finally, the product was allowed to cool to room temperature (25° C.).

*Component B.*—A blend of 51 parts by weight of dioctyl sebacate, a plasticizer-softener, 10 parts by weight of N-methylmorpholine and 2.5 parts by weight of triethylamine catalysts, 5.0 parts by weight of a conventional silicone foam stabilizer, [Dow Corning DC–200 (50 cstks.)], and 22.5 parts by weight of water was prepared at 30° C.

To component B were added 1000 parts by weight of component A and the mixture was stirred rapidly for about 20 seconds. Immediately thereafter the mass was poured into a container of sufficient volume to permit expansion. After about 30 minutes the container together with the foamed mass was placed in an oven and maintained at 70° C. for 16 hours. The product in the form of an open-celled cellular structure was removed from the container and cut into blocks. Density of the blocks was about 0.031 g./cc. Pore size was about 0.1 mm. in diameter.

PREPARATION 4.—OPEN CELLED POLYALKYLENE ETHER-AMINE POLYURETHANE FOAM

*Component A.*—To a closed vessel equipped with an agitator and a nitrogen gas sweep were charged, at an initial temperature of 25° C., 10.3 parts by weight of the above-identified mixture of isomeric toluene diisocyanates, and 100 parts by weight of a polyetheramine prepared by sequentially adding propylene and ethylene oxide to ethylene diamine ("Tetronic 701," sold by Wyandotte Chemicals Corporation, Wyandotte, Michigan). The mixture was allowed to exotherm and the temperature was raised to and maintained at 80° C. for 1 hour. Next an additional 25 parts by weight of the diisocyanate were added and mixed in for 1 hour at 80° C. The resulting product was then allowed to cool to room temperature.

*Component B.*—The following were blended together at 25° C.:

| | Parts by weight |
|---|---|
| Water | 2.2 |
| N-methylmorpholine | 0.8 |
| Triethylamine | 0.2 |
| Foam stabilizer of Preparation 3 | 0.5 |

This was added to 105 parts by weight of a mixture composed of:

| | Parts by weight |
|---|---|
| Component B | 100 |
| The toluenediisocyanate employed in Preparation 1 | 5 | and mixed in rapidly for about 20 seconds. The result was then transferred to a container large enough to permit expansion. After about 30 minutes the container together with the foamed product was placed in an oven at 70° C. for 16 hours.

The resulting product was a flexible cellular mass having a density of 0.032 g./cc., and pores about 0.2 mm. in diameter. The proportion of closed cells was very small.

*Example 1.—Hydrolysis reticulated polyester polyurethane foam*

Blocks of open-celled polyester polyurethane cellular product 12.5 x 7.5 x 2.5 cms. prepared as described in Preparation 1 and having a tensile strength of 28.5 pounds per square inch (2.0 kilograms per square centimeter) are immersed for various periods of time in a bath at a temperature of 50° C. composed of:

| | Parts by weight |
|---|---|
| Sodium hydroxide | 100 |
| Water | 900 |

The blocks are repeatedly kneaded in the bath to insure thorough penetration of the solution. The blocks are then removed from the bath, washed thoroughly with cold water, and immersed in a 2 percent aqueous acetic acid solution and repeatedly kneaded therein to neutralize any remaining sodium hydroxide, then washed with water. The blocks are then placed in an oven held at 120° C. and held there for 2 hours. This treatment after 10 minutes results in removal of the membraneous polyurethane covering the cell faces, leaving a fine network of the original strands defining the outlines of the original cells. Hydrophilicity of the cellular mass is also increased. After a 20 minute treatment, the reticulated structure is retained, but a light, softer product is recovered. The effect of treatment is as follows:

| Time of Treatment | Density (grams per cc.) | Weight Loss (percent) | Softness (mm.) | |
|---|---|---|---|---|
| | | | Dry | Wet |
| 0 | .046 | 0 | 5 | 9 (non-reticulated). |
| 10 | .0414 | 10.9 | 9 | 12 (reticulated). |
| 20 | .0319 | 30.5 | 15 | 20 (reticulated). |

NOTE.—Softness is measured by the penetration of a 12.7 mm. diameter steel hemisphere under a total load of 300 grams.

*Example 2.—Hydrolysis reticulated polyester polyurethane foam*

A foamed open-celled polyester polyurethane cellular structure prepared as described in Preparation 1 was cut into blocks 12.5 x 7.5 x 2.5 cms. This cellular structure had a density of 0.046 gram per cubic centimeter, a pore size (cell face diameter) of about 0.3 mm. and a tensile strength of 35.9 pounds per square inch.

The blocks were treated with a 10 percent by weight aqueous solution of sodium hydroxide at 50° C. for varying lengths of time and then washed with dilute acid and water and dried as described in Example 1.

Results were as follows:

| Time of Treatment (min.) | Membranes Removed | Density (grams per cc.) | Weight Loss (percent) | Load (p.s.i.) Required to Compress | | | | | |
|---|---|---|---|---|---|---|---|---|---|
| | | | | 5% | 10% | 20% | 30% | 40% | 50% |
| 0 | No | 0.046 | 0 | 1.52 | 1.74 | 1.85 | 1.91 | 1.97 | |
| 2 | Partly | 0.046 | 0.8 | .90 | 1.08 | 1.15 | 1.21 | 1.27 | 1.46 |
| 5 | Yes | 0.044 | 3.8 | .80 | .92 | .95 | .97 | 1.03 | 1.20 |
| 10 | Yes | 0.041 | 10.8 | .68 | .76 | .82 | .85 | .93 | 1.12 |
| 20 | Yes | 0.036 | 21.2 | .46 | .58 | .62 | .64 | .70 | .85 |

Compression properties are measured as the pounds per square inch required to produce the given percentage compression, measured as 100×(1-thickness/original thickness).

By comparison with the untreated cellular structure, the reticulated products free of cell face membranes are stronger and tougher. The product of the 10 minute alkali treatment is optimum in balance between completeness of membrane removal and freedom from excessive weight loss. The improved physical properties of this reticulated product as compared to the original foamed cellular structure are shown in the following table:

| | Tensile Strength (p.s.i.) | Tensile Strength at Unit Density (p.s.i.) | Elongation (percent) | Tear Strength (lbs./inch) |
|---|---|---|---|---|
| Starting open-celled foam | 35.9 | 780 | 350 | 5.2 |
| Reticulated foam | 36.3 | 885 | 465 | 5.4 |

Tear strength as reported above was measured on a notched sample. Manual tests on unnotched samples indicate a more sharply marked superiority of the reticulated structure in tear resistance, as a result of the combination of increased tensile strength and increased elongation.

In 10 minutes, elimination of a major portion of the cell faces is visually evident and after 15 minutes, the treatment results in the removal of substantially all of the cell faces leaving a fine 3-dimensional network of the original strands defining the outlines of the original cells.

A greater decrease in weight, but no loss of the reticulated structure is observed in 25 minutes treatment.

The results are as follows:

| Time of Treatment | Density (grams per cc.) | Weight Loss (percent) | Softness (mm.) | |
|---|---|---|---|---|
| | | | Dry | Wet |
| 0 | 0.045 | 0 | 5 | 10 |
| 10 | 0.041 | 16.1 | 12 | 15 |
| 15 | 0.035 | 20.8 | 12 | 18 |
| 25 | 0.029 | 34.3 | 17 | 25 |

*Example 4*

An open-cell polyester polyurethane foam is prepared as described in Preparation 2. The measured tensile strength of this cellular product was 20 pounds per square inch, and the density, 0.047 gram per cubic centimeter.

Blocks of this cellular product are treated with 110 parts by weight of NaOH in 890 parts of water at 60° C., as described in Example 3, for varying lengths of time. A substantial degree of cell face removal is noted within five minutes, while the reticulated structure remains as an integral, recoverable material after treatment times of 15 minutes and longer.

In the following table are presented results of the treatment:

| Time of Treatment (min.) | Membranes Removed | Density (grams per cc.) | Weight Loss (percent) | Load (p.s.i.) Required to Compress | | | | | |
|---|---|---|---|---|---|---|---|---|---|
| | | | | 5% | 10% | 20% | 30% | 40% | 50% |
| 0 | No | 0.047 | 0 | .12 | .28 | .46 | .54 | .62 | .71 |
| 5 | Yes | 0.044 | 6.0 | .12 | .27 | .40 | .46 | .52 | .60 |
| 10 | Yes | 0.040 | 14.1 | .11 | .20 | .28 | .33 | .39 | .46 |
| 15 | Yes | 0.034 | 27.7 | .05 | .11 | .16 | .19 | .24 | .29 |
| 25 | Yes | 0.027 | 41.8 | .03 | .05 | .07 | .09 | .11 | .14 |

*Example 3.—Hydrolysis reticulated polyurethane foam*

Blocks of open-celled polymeric polyester polyurethane sponge prepared as described in Preparation 2, having a tensile strength of 28.5 pounds per square inch and a density of 0.045 gram per cubic centimeter, are immersed in the following bath, maintained at 60° C., for various periods of time:

| | Parts |
|---|---|
| Sodium hydroxide | 110 |
| Water | 890 |

The blocks are kneaded repeatedly to insure thorough penetration of the solution. The blocks are then removed from the bath, squeezed to remove excess solution and washed with water. Then they are immersed in a 2 percent aqueous acetic acid solution and kneaded repeatedly to neutralize any residual sodium hydroxide. The blocks are then washed with water and dried at 120° C. for two hours.

The porous and soft reticulated products are of increased strength and cohesiveness as compared to the untreated cellular structure, and are markedly less easily torn. The product of the 10 minutes treatment, with a 14.1% weight decrease as compared to the original foamed structure, has an elongation of 392 percent, as compared to 295 percent for the original structure, and the tensile strength of the former at unit density is 460 pounds per square inch, as compared to 425 pounds per square inch for the latter.

*Example 5*

In this example, a foamed polymeric polyester polyurethane is prepared as described in Preparation 1, but having pores averaging 1.5–3 mm. in diameter. Pore size is increased by addition of a small quantity of SAE motor oil to the mix prior to foaming. Blocks of the foamed cellular structure are immersed in a 10 percent solution of sodium hydroxide maintained at 90° C. for one minute. The blocks are repeatedly kneaded while immersed. The blocks are then removed from the bath and washed with cold water, washed with dilute acetic acid to neutralize any remaining sodium hydroxide, and again washed with water. The blocks are then washed with sodium bicarbonate solution, and again with plain water. They are then dried in an oven at 70° C. for 3 hours.

This treatment results in removal of the original cell faces, leaving a network of the original strands. The product is somewhat more coarse than the products of the preceding examples.

With a block of foam having an original density of 0.039 gram per cubic centimeter, after treatment, the density is 0.023, and the original dry softness of 7 mm. is increased to more than 20 mm.

With a foamed product of the 1.5–3 mm. pore size having a density of 0.041 gram per cubic centimeter, the treatment produces a decrease in density to 0.036 gram per cubic centimeter, and the pressure in pounds per square inch required to produce 5 percent compression of the structure is reduced from 1.90 to 0.54. Improvement in the strength properties of the structure is observed as shown in the following table:

|  | Density (grams per cc.) | Weight Loss (percent) | Tensile Strength (p.s.i.) | Tensile Strength at Unit Density (p.s.i.) | Elongation (percent) | Tear Strength (lbs./inch) |
|---|---|---|---|---|---|---|
| Cellular Structure | 0.041 | 0 | 24.0 | 585 | 255 | 5.4 |
| Reticulated Structure | 0.036 | 11.4 | 24.2 | 665 | 385 | 5.9 |

*Example 6.—Hydrolysis reticulated polyurethane foam*

In this example a block prepared as in Preparation 1, but having cell faces averaging about 4 to 8 mm. in diameter, is subjected to the same treatment as in Example 5.

The treatment removes all the original cell faces, leaving a coarse network of the original strands.

From a cellular structure with an 0.058 gram per cubic centimeter density, there was produced a reticulated structure with the density of 0.037. The original dry softness of this foamed structure was 5 mm. After treatment the softness is 12 mm.

In a repetition of this procedure, with a cellular structure of 4 to 8 mm. pore size and an original density of 0.044, results obtained were as follows:

|  | Density (grams per cc.) | Weight Loss (percent) | Tensile Strength (p.s.i.) | Tensile Strength at Unit Density (p.s.i.) | Tear Strength (lbs./inch) |
|---|---|---|---|---|---|
| Cellular Structure | 0.044 | 0 | 15.4 | 350 | 3.6 |
| Reticulated Structure | 0.041 | 7.4 | 15.8 | 390 | 6.1 |

|  | Load (p.s.i.) Required to Compress | | | | | |
|---|---|---|---|---|---|---|
|  | 5% | 10% | 20% | 30% | 40% | 50% |
| Cellular Structure | 1.20 | 1.84 | 1.67 | 1.68 | 1.77 | 1.88 |
| Reticulated Structure | .34 | .67 | .67 | .72 | .76 | .94 |

*Example 7.—Hydrolysis reticulated foam*

In this example, there is employed a commercial polyester polyurethane foam ("Unifoam AA," sold by W. T. Burnett & Co., Baltimore, Maryland).

Blocks of the foam were treated respectively for ¾ and for four minutes with 10 percent aqueous sodium hydroxide at 80° C., and then washed with water and dried at 100° C.

Results were as follows:

| Time of Treatment (min.) | Density (grams per cc.) | Elongation (percent) | Load (p.s.i.) Required to Compress | | |
|---|---|---|---|---|---|
|  |  |  | 10% | 50% | 80% |
| 0 | 0.039 | 220 | .73 | .98 | 3.45 |
| ¾ | 0.038 | 240 | .41 | .67 | 2.35 |
| 4 | 0.028 | 280 | .12 | .23 | 1.15 |

Removal of cell faces was visually evident in the block subjected to the ¾ minute treatment, while the product of 4 minutes treatment was a fine network of strands.

*Example 8.—Hydrolysis reticulated polyether polyurethane foam*

A block of the cellular polymeric polyether-polyurethane foam of Preparation 3 was immersed and kneaded in a bath composed of:

Parts by weight
Sodium hydroxide ______________________________ 200
Water _______________________________________ 800 at the boil temperature of the bath for a period of 10 minutes. The block was then removed, washed well with cold water, and rinsed with 2 percent acetic acid to neutralize any residual sodium hydroxide. Finally it was washed in water and dried at 100° C. for 3 hours.

Visual examination of the product indicated the membranes covering the cell faces had been removed leaving behind a characteristic porous skeletal structure.

Loss of weight was very small, less than 2 percent.

Tests of this product and on an untreated block of the Example 11 product gave the following results:

|  | Untreated | Treated |
|---|---|---|
| Tensile Strength, p.s.i | 14 | 20 |
| Softness: |  |  |
| P.s.i. to compress 10 percent | 0.36 | 0.18 |
| P.s.i to compress 20 percent | .47 | .25 |
| P.s.i. to compress 30 percent | .51 | .30 |
| P.s.i. to compress 50 percent | .61 | .40 |

Thermal conductivity was changed very little by the treatment:

|  | Untreated | Treated |
|---|---|---|
| K-B.t.u./hr./ft.²/° F./inch | 0.334 | 0.353 |

Manual tests indicated a marked increase in tear resistance as a result of the treatment.

*Example 9.—Hydrolysis reticulated polymer polyether-amine polyurethane foam*

Blocks of the polymeric polyether-amine polyurethane cellular product of Preparation 4 were treated for various periods of time in boiling 20 percent sodium hydroxide as described above. The treated products have a major proportion, up to all, of the cell membranes eliminated, and are porous, reticulated structures. Improved strength properties are observed in the products treated for 5-15 minutes. After 20 minutes treatment, a very soft, fine reticulated structure is obtained.

Results were as follows:

| Time of Treatment (min.) | Density (grams per cc.) | Weight Loss (percent) | Tensile Strength (p.s.i.) | Tensile Strength at Unit Density (p.s.i.) | Elongation (percent) |
|---|---|---|---|---|---|
| 0 | .032 | 0 | 4.8 | 150 | 105 |
| 5 | .031 | 3.1 | 6.2 | 200 | 165 |
| 10 | .030 | 5.7 | 6.5 | 217 | 165 |
| 15 | .029 | 10.8 | 6.9 | 238 | 220 |
| 20 | .023 | 27.9 | 3.1 | 135 | 170 |

SOFTNESS

| Time of Treatment (min.) | Load (p.s.i.) Required to Compress | | | | | |
|---|---|---|---|---|---|---|
|  | 5% | 10% | 20% | 30% | 40% | 60% |
| 0 | 0.29 | 0.30 | 0.33 | 0.35 | 0.39 | 0.57 |
| 5 | .15 | .19 | .20 | .21 | .24 | .36 |
| 10 | .11 | .12 | .13 | .14 | .16 | .27 |
| 15 | .07 | .08 | .09 | .10 | .12 | .19 |
| 20 |  | .01 | .02 | .03 | .04 | .06 |

In all of the above examples, the strands and nexus of the reticulated products were substantially free from permeatoidal degradation.

*Example 10.—Acid hydrolysis reticulated polyurethane foam*

Blocks of polyether-polyurethane cellular product prepared as in Preparation 3 were kneaded in 19% hydrochloric acid solution at a temperature of 50° C. for 15 and for 60 minutes, respectively. The blocks were then washed well with water, dried at 105° C. for 3 hours and examined. Visual examination indicated that both treated samples had substantially all the cell face membranes removed. Weight loss was low, 0.4–0.5%.

Results were as follows:

| Time of Treatment (min.) | Load (p.s.i.) Required to Compress | | | | | |
|---|---|---|---|---|---|---|
|  | 5% | 10% | 20% | 30% | 40% | 60% |
| 0 | .21 | .42 | .53 | .58 | .62 | .68 |
| 15 | .14 | .26 | .37 | .41 | .45 | .52 |
| 60 | .16 | .27 | .37 | .42 | .47 | .54 |

*Example 11.—Explosion reticulated polyurethane foam*

Acetylene, oxygen, and nitrogen obtained from separate cylinders were mixed to the desired composition in a mixing chamber equipped with a flame arrester installed in the flammable gas line to prevent flash-back. A vacuum pipe was connected to an eductor through a stop valve. Pressure inside the vacuum pipe was indicated by a mercury manometer. An automobile spark plug, powered by an ignition coil was mounted inside the vacuum pipe assembly to provide an ignition source. A stop valve permitted the gas mixture to be passed into the vacuum pipe assembly as required, while another stop valve was present in the manometer line to protect the manometer against pressure surges.

A large loaf of flexible open-celled membranes polyurethane foam, of a density of 1.90 pounds per cubic foot and of a pore size 10 to the linear inch, (10 p.p.i.), was prepared by a conventional one-shot foaming process using 80/20 isomeric mixture of 2-4, 2-6 toluene diisocyanate and "Fomrez 50," an adipate polyester, produced by the Witco Chemical Company which is reported to have a hydroxyl number of 51.8, an acid number of less than 1.0 and a viscosity of 18100 centipoises at 25° C. After curing, blocks were cut from the loaf and saturated with the selected gaseous mixture using the above-described equipment. The mixture was ignited with the spark plug, producing a loud explosion which, surprisingly, did not destroy the foam. The results of these reticulation experiments are summarized in Table 1.

TABLE 1.—RETICULATION WITH ACETYLENE-OXYGEN-NITROGEN MIXTURES OF 10 P.P.I. ADIPATE POLYESTER-URETHANE FOAM

| Gas Composition, Vol. Percent | | | Foam Weight Loss, Percent | Nature of Explosion |
|---|---|---|---|---|
| O₂ | C₂H₂ | N₂ | | |
| 35.5 | 14.2 | 50.3 | 1.0 | Loud. |
| 32.0 | 13 | 55 | 1.0 | Do. |
| 30 | 25 | 45 | 1.5 | Very loud. |
| 60 | 15 | 25 | 2.4 | Do. |
| 70 | 15 | 15 | 3.8 | Do. |
| 80 | 10 | 10 | 3.0 | Do. |
| 60 | 10 | 30 | 2.4 | Loud. |
| 65 | 14 | 21 | 2.1 | Do. |
| 30 | 30 | 40 | 1.2 | Do. |
| 35 | 35 | 30 | 1.4 | Do. |
| 40 | 40 | 20 | 1.6 | Do. |
| 90 | 10 | 0 | 3.4 | Very loud. |
| 45 | 50 | 5 | 1.5 | Loud. |
| 80 | 7 | 13 | 2.1 | Very loud. |
| 95 | 5 | 0 | 2.3 | Do. |
| 79 | 6 | 15 | 1.5 | Loud. |
| 52 | 13 | 35 | 2.3 | Do. |
| 29 | 17 | 54 | 1.3 | Do. |
| 71 | 29 | 0 | 3.9 | Very loud. |
| 60 | 25 | 15 | 3.0 | Do. |
| 45 | 30 | 25 | 2.4 | Do. |
| 40 | 40 | 20 | .6 | Loud. |
| 37 | 15 | 48 |  | Very loud. |
| 70 | 20 | 10 | 3.7 | Loud. |
| 40 | 25 | 35 | 1.5 | Do. |
| 85 | 15 | 0 | 3.8 | Very loud. |

All of the explosion reticulated products showed no indication of permeatoidally degraded strands and nexus.

*Steam reticulated polyester polyurethane foam.*— Blocks of a foamed structure prepared as described in Preparation 1 and having a pore size of about 0.3 mm. and a tensile strength of 35.9 pounds per square inch are wet out with water, and then placed in a pressure vessel and subjected to the action of saturated steam at 20 p.s.i. gauge.

At the end of 4 hours, there is observed a decrease in density of 0.044 p.s.i., and a weight loss of 4.7%. The product is a reticulated structure which is markedly softer and more porous than the original cellular material. The strands and nexus show evidences of substantial permeatoidal degradation.

Blocks of polyether-polyurethane cellular product prepared as in Preparation 3 were autoclaved with 20 p.s.i.g. steam for from 2 to 8 hours. The blocks were then dried at 105° C. for 3 hours and examined.

Visual examination indicated that the 2 hour treatment resulted in substantial but incomplete removal of the cell face membranes, while the 4 and 8 hour treatments resulted in substantially complete removal of all the membranes. All showed evidences of varying substantial degrees of strand and nexus permeatoidal degradation.

Blocks of polyether-amine polyurethane cellular product prepared as in Preparation 4 were autoclaved with 20 p.s.i.g. steam for from 1 to 8 hours. The blocks were then dried at 105° C. for 3 hours and examined.

Visual examination indicated that the cell face membranes were substantially completely removed from all the treated samples. The strands and nexus of the product of 1 hour treatment appeared to have the least amount of permeatoidal degradation. However, in samples in which the membraneous polymer was substantially eliminated, such loss was always accompanied by substantial permeatoidal degradation.

It will be evident from the foregoing that a variety of hydrolyzing agents and hydrolyzing conditions may be employed to convert a diversity of permeable polymeric cellular structures to more porous structures which are of improved physical properties in respect to softness, tensile and tear strength, and in other respects. While the invention has been described with reference to various particular preferred embodiments thereof, it will be appreciated that numerous modifications and variations can be made without departure therefrom.

What is claimed is:

1. A 3-dimensional network of interconnecting strands of a polyurethane resin formed by the reaction of an organic polyisocyanate with a polymer selected from at least one member of the group consisting of polyalkylene ether glycols, polyalkylene ether amines produced by the reaction of alkyleneoxides with polyamines and polyesters produced by the reaction of polyhydric alcohols with polycarboxylic acids, said strands being integrally interconnected by thickened nexus at spaced apart points so as to form the isotropic skeletal outline of a multitude of polyhedrons whose faces are polygonal, are common to a polyhedron adjacent thereto and are open and free from membraneous polyurethane resin, said network being substantially free from permeatoidally degraded strands and nexus.

2. A product according to claim 1 formed of a polyester polyurethane as defined therein.

3. A product according to claim 1 formed of a polyalkylene ether amine polyurethane as defined therein.

4. A product according to claim 1 formed of a polyether glycol polyurethane as defined therein.

5. A flexible 3-dimensional network of interconnecting strands of a polyester polyurethane resin, having a pore size from about 0.2 to 8 mm. and a softness in the dry state, as measured by the penetration of a 12.7 mm. diameter steel hemisphere under a total load of 300 grams, of at least 9 mm. and a density from about 0.023 to .041, integrally interconnected by thickened nexus at spaced apart points so as to form the isotropic skeletal outline of a multitude of polyhedrons whose faces are polygonal, are common to a polyhedron adjacent thereto and are open and free from membraneous polyurethane resin, said network being substantially free from permeatoidaly degraded strands and nexus.

6. A product according to claim 5 having a pore size from about 0.2 to 0.3 mm., a density from about 0.029 to 0.041 and a dry softness from 9 to 17 mm.

7. The method of making a 3-dimensional network of interconnecting strands of polyurethane resin which comprises subjecting a foamed open cell cellular structure formed of a hydrolyzable polyurethane resin to the hydrolytic action of water in the presence of an alkali-metal hydroxide as hydrolysis catalyst in sufficient concentration to activate hydrolysis at a temperature of at least 20° C. and to effect in the foam a weight loss of from 0.5% to about 41.8%, as the result of the removal of a portion of the foam, primarily the cell faces thereof, arresting further hydrolytic action on said foam, drying the treated foam and recovering a skeletal network structure.

8. The process as defined in claim 7 in which the temperature of the hydrolyzing treatment is at least 50° C.

9. The method of making a 3-dimensional network of interconnecting strands of polyurethane resin which comprises subjecting a foamed open cell cellular polyurethane resin, formed by the reaction of an organic polyisocyanate with a polymer selected from at least one member of the group consisting of polyalkylene ether glycols, polyalkylene ether amines produced by the reaction of alkyleneoxides with polyamines and polyesters produced by the reaction of polyhydric alcohols with polycarboxylic acids to the hydrolytic action of water in the presence of an alkali-metal hydroxide as hydrolysis catalyst in sufficient concentration to activate hydrolysis at a temperature of at least 20° C. and to effect in the foam a weight loss of from 0.5% to about 41.8%, as the result of the removal of a portion of the foam, including substantially all of the resin forming the cell faces thereof; arresting further hydrolytic action on said foam; and recovering the resulting skeletal network structure.

10. The method of claim 9 in which the hydrolysis catalyst comprises sodium hydroxide.

11. The process as defined in claim 10 in which the concentration of the sodium hydroxide is at least 5%, the temperature of the hydrolyzing treatment is above 50° C. and said treatment is continued for from 2 to 20 minutes.

12. The method of making a 3-dimensional network of interconnecting strands of polyurethane resin which comprises subjecting a foamed open cell cellular polyurethane resin, formed by the reaction of an organic polyisocyanate with a polyester produced by the reaction of polyhydric alcohol with polycarboxylic acid, to the action of an aqueous solution of alkali metal hydroxide at a temperature of at least 50° C. for from 2 to 20 minutes to effect a weight loss in the resin foam of from 5 to 15% as the result of the elimination of a portion of the foam, removing the foam from the alkali solution to arrest further chemical action thereon, drying the treated foam and recovering a skeletal network structure.

References Cited by the Examiner

UNITED STATES PATENTS

| 2,770,241 | 11/56 | Winkler | 260—2.5 |
| 2,839,478 | 6/58 | Wilms et al. | 260—2.5 |
| 2,888,409 | 5/59 | Bender et al. | 260—2.5 |

FOREIGN PATENTS

| 543,362 | 12/55 | Belgium. |
| 915,033 | 7/54 | Germany. |

OTHER REFERENCES

Remington et al.: "Urethane Resilient Cellular Foams Made From Polyesters," Dupont Elastomer Div. Bul. HR–10, Feb. 15, 1956, page 14.

LEON J. BERCOVITZ, *Primary Examiner.*